United States Patent [19]

Lauf et al.

[11] Patent Number: 5,185,031
[45] Date of Patent: Feb. 9, 1993

[54] DEVICE AND METHOD FOR SKULL-MELTING DEPTH MEASUREMENT

[75] Inventors: Robert J. Lauf; Richard L. Heestand, both of Oak Ridge, Tenn.

[73] Assignee: Martin Marietta Energy Systems, Inc., Oak Ridge, Tenn.

[21] Appl. No.: 815,465

[22] Filed: Dec. 31, 1991

[51] Int. Cl.⁵ .............................................. C22B 4/00
[52] U.S. Cl. ...................................... 75/375; 266/78; 266/96; 75/621
[58] Field of Search ................ 266/78, 96, 94, 905, 266/200, 275; 75/375, 386, 620, 621; 340/3; 73/290 V

[56] References Cited

U.S. PATENT DOCUMENTS

| | | | |
|---|---|---|---|
| 2,775,748 | 12/1956 | Rod et al. | 340/3 |
| 3,100,885 | 8/1963 | Welkowitz et al. | 340/3 |
| 3,660,074 | 5/1972 | Buehl | 75/621 |
| 3,734,480 | 5/1973 | Zanis et al. | 266/905 |
| 4,580,448 | 4/1986 | Skrgatic | 73/290 V |
| 4,794,335 | 12/1988 | Linder | 324/204 |
| 4,932,635 | 6/1990 | Harker | 266/200 |

*Primary Examiner*—Scott Kastler
*Attorney, Agent, or Firm*—Joseph A. Marasco; Harold W. Adams

[57] ABSTRACT

A method of skull-melting comprises the steps of:
a. providing a vessel adapted for a skull-melting process, the vessel having an interior, an underside, and an orifice in connecting the interior and the underside;
b. disposing a waveguide in the orifice so that the waveguide protrudes sufficiently into the interior to interact with the skull-melting process;
c. providing a signal energy transducer in signal communication with the waveguide;
d. introducing into the vessel a molten working material;
e. carrying out the skull-melting process so that a solidified skull of the working material is formed, the skull and the vessel having an interface therebetween, the skull becoming fused to the waveguide so the signal energy can be transmitted through the waveguide and the skull without interference from the interface;
f. activating the signal energy transducer so that a signal is propagated through the waveguide; and,
g. controlling at least one variable of the skull-melting process utilizing feedback information derived from the propagated signal energy.

26 Claims, 2 Drawing Sheets

DEVICE AND METHOD FOR SKULL-MELTING DEPTH MEASUREMENT

The U.S. Government has rights in this invention pursuant to contract no. DE-AC05-84OR21400 between the U.S. Department of Energy and Martin Marietta Energy Systems, Inc.

FIELD OF THE INVENTION

The present invention relates to devices and methods for controlling the process of skull-melting materials, especially metals, and more particularly to devices and methods for measuring the depth of molten metal above a skull of solid material in a hearth during a skull-melting process.

BACKGROUND OF THE INVENTION

In the field of metal processing, it is well known that certain metals such as titanium are highly reactive in the molten state, and are conducive to refinement by re-melting in crucibles. To prevent undesirable reactions with the crucible material, the well known "skull-melting" method was developed, in which the liquid working metal is contained in a solid shell or "skull" of the same metal, which in turn is surrounded by a water-cooled hearth. Heating is provided by a plasma torch disposed above the working metal surface, the plasma torch being moved about the surface area to provide uniform transfer of heat to the working metal.

For many processes, such as the continuous or semi-continuous plasma remelting of titanium, it is important to know the volume of molten working metal in the hearth. A certain minimum residence time in the liquid state must be maintained in order to decompose low-density inclusions, which would limit the strength of the metal. To determine the volume of working metal in the molten state, it is necessary to know both the level of the molten pool and the thickness of the solid skull underneath. Access to the top surface of the pool of molten working metal is limited by the moving plasma torch above the surface. Therefore, ultrasonic devices have been placed on the underside of the hearth to obtain measurements indicative of liquid depth and skull thickness.

At the same time, however, in order to minimize heat loss to the hearth, a rough, low density, low heat conductivity interface is intentionally created between the hearth and the skull. Ultrasonic devices placed under the hearth are thus rendered ineffective because the interface prevents sonic coupling to the skull. A means for coupling a transducer directly to the skull is thus required for successful transmission of the ultrasonic signal for accurate, precise liquid depth measurement.

OBJECTS OF THE INVENTION

Accordingly, it is an object of the present invention to provide a new and improved device and method for skull-melting.

It is another object of the present invention to provide a new and improved means for determining the depth of molten material in a skull-type melt.

It is also an object of this invention to provide a low-loss waveguide that will allow the propagation of an ultrasonic signal into a skull-melt in order to continuously determine liquid level and skull thickness.

It is another object of this invention to provide an ultrasonic skull-melt depth measurement waveguide that is compatible with any material being subject to the skull-melting process.

It is a further object of this invention to provide a method for skull-melt depth measurement suitable for real-time process control.

Further and other objects of the present invention will become apparent from the description contained herein.

SUMMARY OF THE INVENTION

In accordance with one aspect of the present invention, the foregoing and other objects are achieved by apparatus for skull-melting which comprises a vessel adapted for a skull-melting process, the vessel containing a skull of working material; a signal energy transducer; and, a waveguide disposed in communication with the skull and the signal energy transducer for transmitting signal energy between the skull and the signal energy transducer.

In accordance with another aspect of the present invention, apparatus for skull-melting comprises a vessel adapted for a skull-melting process, the vessel having an interior for receiving a charge of working material, the vessel having an underside, the vessel having an orifice in communication with the interior and the underside; and, a waveguide disposed in the orifice.

In accordance with another aspect of the present invention, apparatus for skull-melting comprises a vessel adapted for a skull-melting process, the vessel having an interior for receiving a charge of working material, the vessel having an underside, the vessel having an orifice in communication with the interior and the underside; a waveguide disposed in the orifice, the waveguide comprising a plug of material that is essentially identical to the working material; a solidified skull of the working material, the skull containing a charge of molten working material, the skull and the vessel having an interface therebetween, the skull being fused to the waveguide so that signal energy can be transmitted through the waveguide and the skull without interference from the interface; and, a signal energy transducer in signal communication with the waveguide, the signal energy transducer comprising means for generating and receiving shear sonic waves and longitudinal sonic waves.

In accordance with another aspect of the present invention, a method of skull-melting comprises the steps of:

a. providing a vessel adapted for a skull-melting process, the vessel having an interior, the vessel having an underside, the vessel having an orifice in communication with the interior and the underside;

b. disposing a waveguide in the orifice so that the waveguide protrudes sufficiently into the interior to interact with the skull-melting process;

c. providing a signal energy transducer in signal communication with the waveguide;

d. introducing into the vessel a molten working material;

e. carrying out the skull-melting process so that a solidified skull of the working material is formed, the skull and the vessel having an interface therebetween, the skull becoming fused to the waveguide so that signal energy can be transmitted through the waveguide and the skull without interference from the interface;

f. activating the signal energy transducer so that a signal is propagated through the waveguide; and, g. controlling at least one variable of the skull-melting process utilizing feedback information derived from the propagated signal energy.

For a better understanding of the present invention, together with other and further objects, advantages and capabilities thereof, reference is made to the following disclosure and appended claims in connection with the above-described drawings.

DETAILED DESCRIPTION OF THE INVENTION

Figure 1:
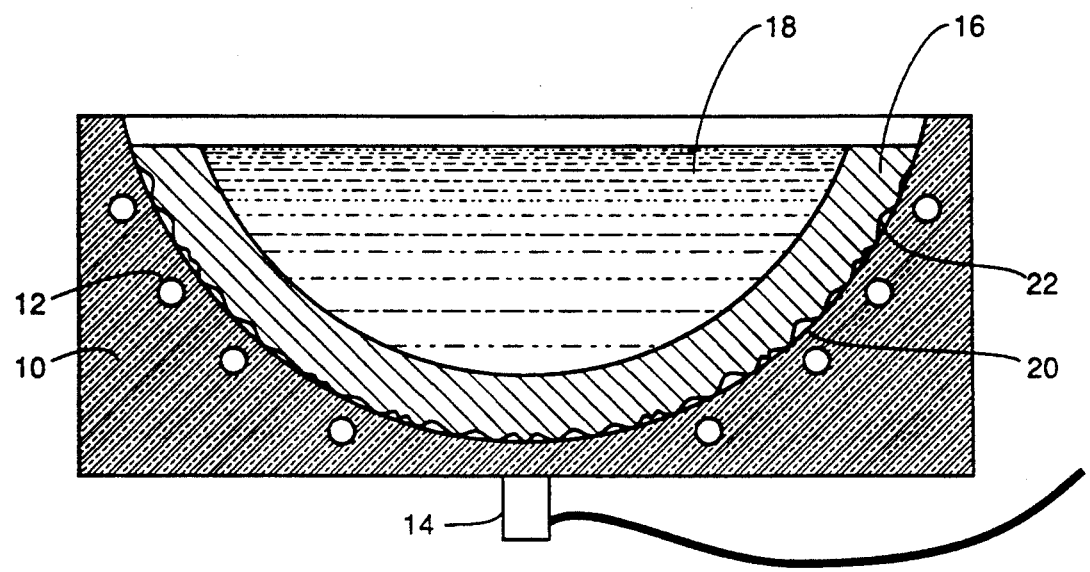
FIG. 1 is a cross sectional view of a skull-melting hearth having a transducer affixed to the underside thereof.

Referring to FIG. 1, skull-melting generally takes place in a dish-shaped hearth 10, generally composed of copper, having cavities 12 which accommodate cooling liquid. A transducer device 14 is affixed to the underside of the hearth 10. During a skull-melting process, the hearth 10 will contain a shell, or "skull" 16 of solidified working metal which contains a melt 18 of molten working metal. A rough, low density, low conductivity interface 20 between the hearth 10 and the skull 16 is generally characterized by cavities 22 formed on the bottom of the skull 16.

Figure 2:
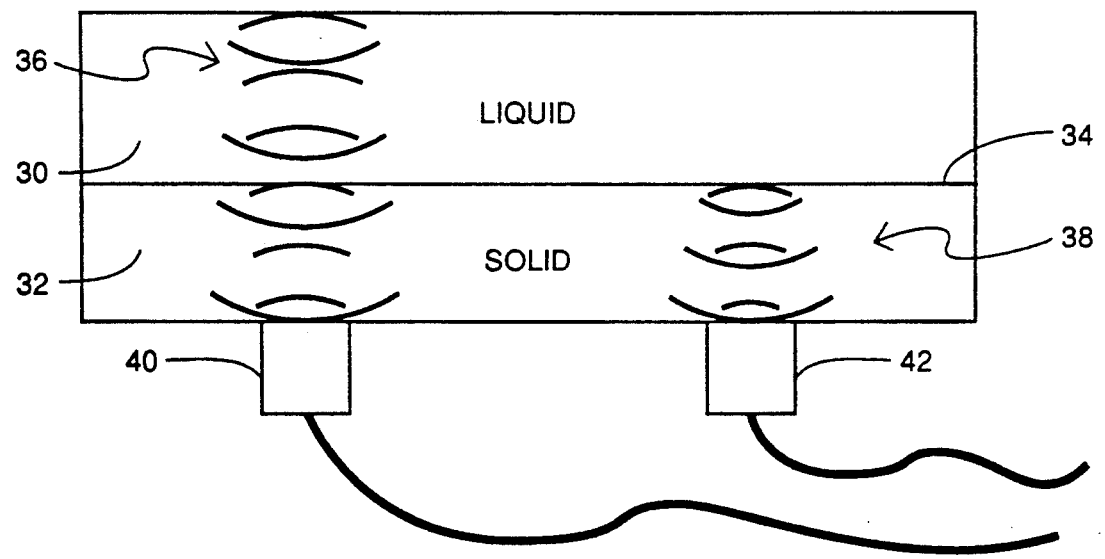
FIG. 2 is a schematic diagram of a liquid/solid interface demonstrating the propagation characteristics of longitudinal and shear sonic waves.

FIG. 2 demonstrates the propagation characteristics of longitudinal and shear sonic waves. A liquid 30 is above a solid 32, having an interface 34. Longitudinal sonic waves 36 and shear sonic waves 38 are produced by transducers 40, 42. It is well known that longitudinal sonic waves 36 can propagate through both solids and liquids, whereas shear sonic waves 38 can only propagate through solids. Thus, a combination of both types of signal can measure solid and liquid depths simultaneously. The precision and accuracy of these measurements depends on the wavelength of the signal, and the shorter wavelengths (higher frequencies) are more desirable. Transducer devices are available which can produce both longitudinal and shear sonic waves, or signals, from a single unit.

Referring again to FIG. 1, during skull-melting processes, a rough, low density, low conductivity interface 20 is intentionally created to minimize heat loss into the hearth 10. Signals from the ultrasonic transducer device 14 must pass through the hearth 10 and then through the rough interface 20 before entering the skull 16 and the melt 18. The rough interface 20 effectively precludes the use of ultrasonic wavelengths that are short enough to afford sufficient resolution for adequate process control.

Figure 3:
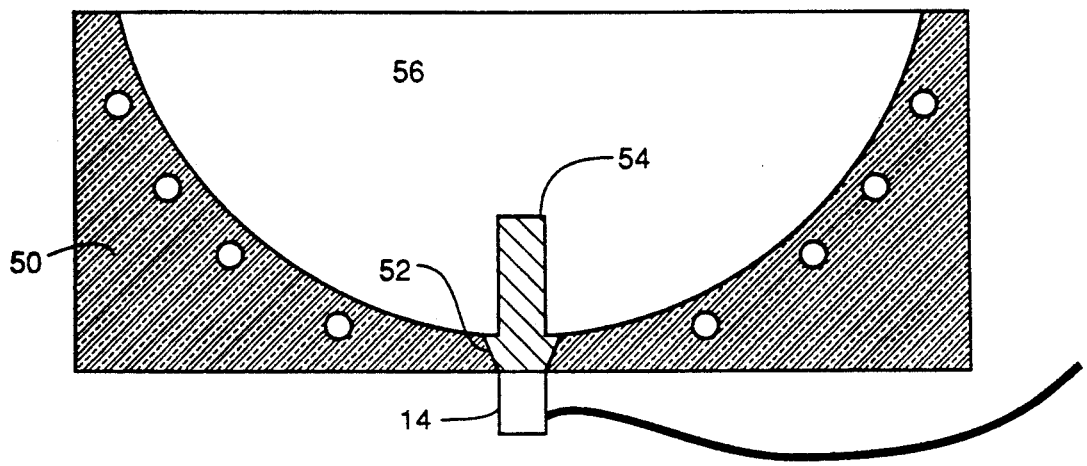
FIG. 3 is a cross sectional view of a skull-melting hearth having a transducer and plug inserted therein according to the present invention.

Referring now to FIG. 3, the present invention solves the above described problem by utilizing a modified hearth 50 having an orifice 52, preferably tapered, in the bottom thereof so that a solid, low-loss waveguide 54 can be inserted therein in plug fashion. The waveguide 54 is preferably fabricated from the same material as the working metal. The waveguide 54, preferably tapered with a self-holding taper for good sealing and ease of insertion and removal, protrudes upwardly into the hearth interior 56 to a point inward of the anticipated thickness of the skull, so that contact of the waveguide 54 with the melt will be insured. The waveguide 54 is shown to be flush with the underside of the hearth 50, but it may be convenient for it to protrude or recess. The transducer device 14 is in this case affixed to the underside of the waveguide 54.

Figure 4:
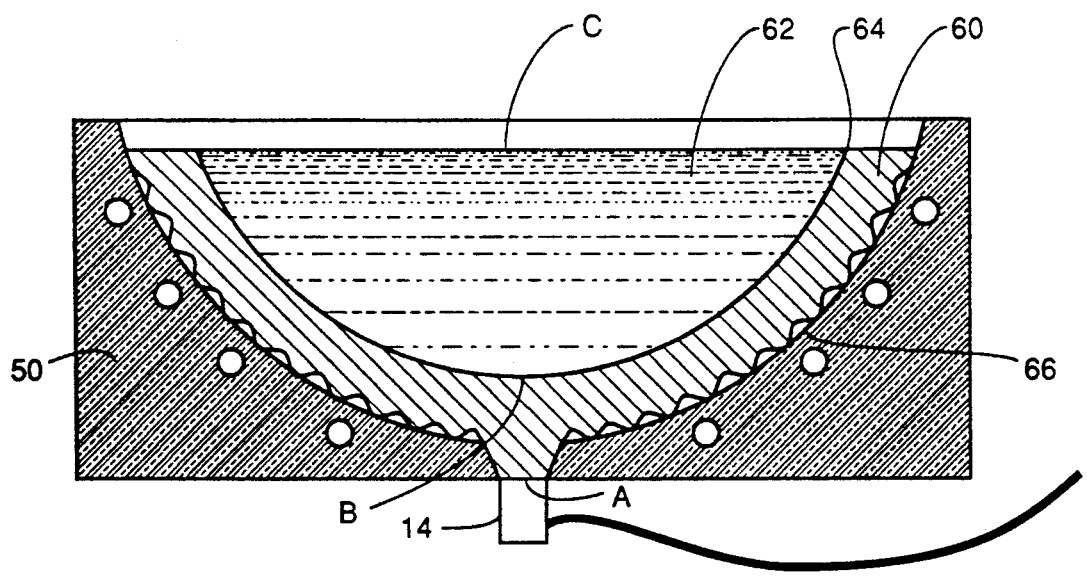
FIG. 4 is a cross sectional view of the skull-melting hearth of FIG. 3 during the skull-melting process.

FIG. 4 shows the skull-melting hearth 50 of FIG. 3 during the skull-melting process. As the skull 60 and the melt 62 are formed, the waveguide 54 partially melts and fuses with the skull 60 to become an integral part thereof, if it is made of the same material. This is quite desirable because it eliminates contamination of the working metal, and assures that the waveguide 54 will melt back to the level of the melt/skull interface 64. Cooling from the surrounding hearth 50 prevents leakage of molten metal around the waveguide 54.

Ultrasonic measurement of distances from the waveguide bottom (A) to the melt/skull interface 64 (B), and to the melt 62 surface (C), are now possible with no interference from the rough interface 66 between the skull 60 and hearth 50. Using a frequency of 5 to 10 MHz, it is possible to measure the skull thickness (A-B) and depth of the melt (B-C) to within 0.1 in.

Upon completion of the skull-melting process, the waveguide 54 and remaining skull 60 can be knocked out of the hearth 50 from the bottom, generally as one piece, and a new waveguide can be inserted.

Additional refinements such as shaped or focused transducers may be implemented as needed to achieve higher levels of speed, precision, and accuracy. Also, multiple transducers and waveguides may be suitable for some processes.

The distinct advantages of the present invention are numerous. Direct, non-contact melt depth measurement is now suitable for skull-melting of reactive alloys and metals such as titanium. A novel waveguide by-passes the rough skull/hearth interface, improving resolution by allowing the use of shorter signal wavelengths. The device is easily cleaned and set up for the next skull-melting process, particularly if a different alloy or metal is to be melted. The use of a wave guide composed of the same material as the working metal eliminates opportunities for contamination that might occur if a ceramic or other waveguide were used, and by melting back along with the metal, it gives an unambiguous measure of the location of the melt/skull interface. The waveguide is robust and stable, with a self-holding taper that provides sufficient friction to prevent floating out of its seat in the hearth.

The invention is particularly useful as a part of a process control system, in which the melt level is continuously monitored and controlled to maintain the correct residence time in the hearth. This is a critical step in the production of Ti-6Al-4V alloys for aircraft turbine components.

While there has been shown and described what are at present considered the preferred embodiments of the invention, it will be obvious to those skilled in the art that various changes and modifications can be made therein without departing from the scope of the inventions defined by the appended claims.

What is claimed is:

1. Apparatus for skull-melting comprising:
   a vessel adapted for a skull-melting process, said vessel containing a skull of working material;

What is claimed is:

1. Apparatus for skull-melting comprising:
   a vessel adapted for a skull-melting process, said vessel containing a skull of working material;
   a signal energy transducer; and,
   a waveguide disposed in communication with said skull and said signal energy transducer for transmitting signal energy between said skull and said signal energy transducer.

2. An apparatus according to claim 1 wherein said vessel has an orifice through which said waveguide is disposed.

3. An apparatus according to claim 2 wherein said orifice is tapered toward the exterior of said vessel, and wherein said waveguide is sealably disposed therein.

4. An apparatus according to claim 1 wherein said signal energy transducer comprises means for generating shear sonic waves and longitudinal sonic waves.

5. An apparatus according to claim 1 wherein said signal energy transducer comprises means for receiving shear sonic waves and longitudinal sonic waves.

6. An apparatus according to claim 1 wherein said waveguide comprises a plug of material that is essentially identical to said working material.

7. An apparatus according to claim 1 wherein said vessel further comprises a cooling means for cooling said vessel.

8. An apparatus according to claim 1 wherein said working material comprises a metal.

9. An apparatus according to claim 8 wherein said metal comprises titanium or a titanium alloy.

10. An apparatus according to claim 1 further comprising a control system for controlling at least one process variable utilizing information derived from said transmitted signal energy.

11. Apparatus for skull-melting comprising:
    a vessel adapted for a skull-melting process, said vessel having an interior for receiving a charge of working material, said vessel having an underside, said vessel having an orifice in communication with said interior and said underside; and,
    a waveguide disposed in said orifice.

12. An apparatus according to claim 11 wherein said orifice is tapered toward said underside, and wherein said waveguide is sealably disposed therein.

13. An apparatus according to claim 11 further comprising a signal energy transducer for generating shear sonic waves and longitudinal sonic waves.

14. An apparatus according to claim 13 wherein said signal energy transducer further comprises means for receiving shear sonic waves and longitudinal sonic waves.

15. An apparatus according to claim 11 wherein said waveguide comprises a plug of material that is essentially identical to said working material.

16. An apparatus according to claim 15 further comprising a skull of solidified working material within said vessel, said skull and said vessel having an interface therebetween, said skull being fused to said waveguide so that signal energy can be transmitted through said waveguide and said skull without interference from said interface.

17. Apparatus for skull-melting comprising:
    a vessel adapted for a skull-melting process, said vessel having an interior for receiving a charge of working material, said vessel having an underside, said vessel having an orifice in communication with said interior and said underside;
    a waveguide disposed in said orifice, said waveguide comprising a plug of material that is essentially identical to said working material;
    a solidified skull of said working material, said skull containing a charge of molten working material, said skull and said vessel having an interface therebetween, said skull being fused to said waveguide so that signal energy can be transmitted through said waveguide and said skull without interference from said interface; and
    a signal energy transducer in signal communication with said waveguide, said signal energy transducer comprising means for generating and receiving shear sonic waves and longitudinal sonic waves.

18. An apparatus according to claim 17 wherein said orifice is tapered toward said underside, and wherein said waveguide is sealably disposed therein.

19. An apparatus according to claim 17 wherein said vessel further comprises a cooling means for cooling said vessel.

20. An apparatus according to claim 18 wherein said working material comprises a metal.

21. An apparatus according to claim 20 wherein said metal comprises titanium or a titanium alloy.

22. A method of skull-melting comprising the steps of:
    a. providing a vessel adapted for a skull-melting process, said vessel having an interior, said vessel having an underside, said vessel having an orifice in communication with said interior and said underside;
    b. disposing a waveguide in said orifice so that said waveguide protrudes sufficiently into said interior to interact with said skull-melting process;
    c. providing a signal energy transducer in signal communication with said waveguide;
    d. introducing into said vessel a molten working material;
    e. carrying out said skull-melting process so that a solidified skull of said working material is formed, said skull and said vessel having an interface therebetween, said skull becoming fused to said waveguide so that signal energy can be transmitted through said waveguide and said skull without interference from said interface;
    f. activating said signal energy transducer so that a signal is propagated through said waveguide; and,
    g. controlling at least one variable of said skull-melting process utilizing feedback information derived from said propagated signal energy.

23. A method according to claim 22 wherein said orifice is tapered toward said underside, and wherein said waveguide is sealably disposed therein.

24. A method according to claim 22 wherein said vessel further comprises a cooling means for cooling said vessel.

25. A method according to claim 22 wherein said working material comprises a metal.

26. A method according to claim 25 wherein said metal comprises titanium or a titanium alloy.

* * * * *